(12) United States Patent
Ivers et al.

(10) Patent No.: US 6,234,812 B1
(45) Date of Patent: May 22, 2001

(54) RETRACTABLE POWER AND COMMUNICATION OUTLET ARRANGEMENTS

(76) Inventors: Michael B. Ivers, 49 Harbor Ave., Marblehead, MA (US) 01945; Christian K. Weber, 21 Kenilworth Rd., Worcester, MA (US) 01602

( * ) Notice: Subject to any disclaimer, the term of this patent is extended or adjusted under 35 U.S.C. 154(b) by 0 days.

(21) Appl. No.: 09/443,335

(22) Filed: Nov. 19, 1999

Related U.S. Application Data

(60) Provisional application No. 60/109,737, filed on Nov. 24, 1998.

(51) Int. Cl.[7] ................................................ H01R 13/44
(52) U.S. Cl. ......................... 439/131; 439/378; 439/214; 362/127
(58) Field of Search ..................................... 439/131, 378, 439/214, 215; 362/127

(56) References Cited

U.S. PATENT DOCUMENTS

| D. 353,363 | 12/1994 | Toby ................................ D13/139.4 |
| 1,545,639 | 7/1925 | Cohen ..................................... 439/32 |
| 2,811,574 | 10/1957 | Guerrero ............................... 174/57 |
| 2,811,575 | 10/1957 | Guerrero ............................... 174/57 |
| 3,433,886 | 3/1969 | Myers .................................... 174/57 |
| 3,622,684 | 11/1971 | Press ...................................... 174/48 |
| 3,794,956 | 2/1974 | Dubreuil .............................. 439/131 |
| 4,551,577 | 11/1985 | Byrne ..................................... 174/57 |
| 4,747,788 | 5/1988 | Byrne .................................... 439/131 |
| 4,792,881 | 12/1988 | Wilson et al. ....................... 361/827 |
| 4,984,982 | 1/1991 | Brownlie et al. .................... 439/131 |
| 5,023,396 | 6/1991 | Bartee et al. .......................... 174/48 |
| 5,122,069 | 6/1992 | Brownlie et al. .................... 439/131 |
| 5,230,552 | 7/1993 | Schipper et al. ................... 312/223.6 |
| 5,351,173 | 9/1994 | Byrne .................................... 362/127 |
| 5,575,668 | 11/1996 | Timmerman ........................ 439/131 |

FOREIGN PATENT DOCUMENTS

| 2116401 | 10/1972 | (DE) . |
| 3416486 | 11/1984 | (DE) . |
| 599844 | 11/1959 | (IT) . |
| 52-10586 | 1/1977 | (JP) . |
| 6-22433 | 1/1994 | (JP) . |
| 6-98444 | 4/1994 | (JP) . |
| WO 91/16741 | 10/1991 | (WO) . |

*Primary Examiner*—Paula Bradley
*Assistant Examiner*—Truc Nguyen
(74) *Attorney, Agent, or Firm*—Richard C. Litman

(57) ABSTRACT

Retractable power and communication outlet arrangements suitable for mounting on a work surface such as a table or desk. A first type of a retractable power outlet or a retractable communication includes a bottomless mounting cup for inserting into a hole in the work surface. The mounting cup includes a flat circular top edge and a cylinder. Two grooves are formed inside the cylinder as guides and extend from an upper end of the cylinder to a lower end of the cylinder. The first type of power or communication outlet arrangement additionally includes a mounting bracket. The mounting bracket includes a circular flat top having two opposing semicircular notches. The mounting bracket's flat top is dimensioned to overlap the diameter of the top of the mounting cup. Integrally formed with the mounting bracket's flat top is a longitudinally extending flat element which includes four mounting pegs that extend from the flat element in two rows of two for mounting a power or communication strip. A second type of a retractable power outlet or a communication arrangement omits the flat attachment element and includes a bottomless mounting cup, a mounting cap, and a power or communication strip. The mounting cup for the second type of arrangement includes three longitudinal ridges extending in varying lengths and a shelf in a cylinder.

16 Claims, 5 Drawing Sheets

RETRACTABLE POWER AND COMMUNICATION OUTLET ARRANGEMENTS

CROSS-REFERENCE TO RELATED APPLICATION

This application claims the benefit of U.S. Provisional Patent Application Serial No. 60/109,737, filed Nov. 24, 1998.

BACKGROUND OF THE INVENTION

1. Field of the Invention

The present invention relates generally to outlets, and more particularly to retractable power and communications outlet arrangements.

2. Description of Related Art

Power and communication outlets are widely used in nearly all types of residential, commercial and industrial environments. The typical work surface, such as a table or desk, is generally equipped with a number of devices requiring power or communication connections. This results in numerous power and communication cables which extend to and connect to typical equipment mounted on a work surface. As such, much effort is spent in effecting the convenient and cost effective positioning of power and commercial receptacles for supplying power and communication sources to various types of devices.

The related art is represented by the following patents of interest.

U.S. Design Pat. No. 353,363, issued on Dec. 13, 1994 to Kevin L. Toby, shows a counter top electrical outlet. Toby does not suggest retractable power and communication outlet arrangements according to the claimed invention.

U.S. Pat. No. 1,545,639, issued on Jul. 14, 1925 to Samuel Cohen, describes a vacuum-tube mounting which is movable to different positions. Cohen does not suggest retractable power and communication outlet arrangements according to the claimed invention.

U.S. Pat. No. 2,811,574, issued on Oct. 29, 1957 to John J. Guerrero, describes adjustable floor receptacles for electric or telephone connections. Guerrero '574 does not suggest retractable power and communication outlet arrangements according to the claimed invention.

U.S. Pat. No. 2,811,575, issued on Oct. 29, 1957 to John J. Guerrero, describes adjustable floor receptacles for electric or telephone connections. Guerrero '575 does not suggest retractable power and communication outlet arrangements according to the claimed invention.

U.S. Pat. No. 3,433,886, issued on Mar. 18, 1969 to John L. Myers, describes a recessible electrical service device. Myers does not suggest retractable power and communication outlet arrangements according to the claimed invention.

U.S. Pat. No. 3,622,684, issued on Nov. 23, 1971 to Paul R. Press, describes a rotatable floor receptacle mounting unit. Press does not suggest retractable power and communication outlet arrangements according to the claimed invention.

U.S. Pat. No. 3,794,956, issued on Feb. 26, 1974 to Real R. Dubreuil, describes a retractable electric floor outlet assembly. Dubreuil does not suggest retractable power and communication outlet arrangements according to the claimed invention.

U.S. Pat. No. 4,551,577, issued on Nov. 5, 1985 to Norman R. Byrne, describes a retractable power center. Byrne '577 does not suggest retractable power and communication outlet arrangements according to the claimed invention.

U.S. Pat. No. 4,747,788, issued on May 31, 1988 to Norman R. Byrne, describes a manually operable retractable power center. Byrne '788 does not suggest retractable power and communication outlet arrangements according to the claimed invention.

U.S. Pat. No. 4,792,881, issued on Dec. 20, 1988 to Harold R. Wilson et al., describes a work surface having a power/communication module integral therewith. Wilson et al. do not suggest retractable power and communication outlet arrangements according to the claimed invention.

U.S. Pat. No. 4,984,982, issued on Jan. 15, 1991 to Alan W. Brownlie et al., describes a retractable access flooring module. Brownlie et al. '982 do not suggest retractable power and communication outlet arrangements according to the claimed invention.

U.S. Pat. No. 5,023,396, issued on Jun. 11, 1991 to Edward C. Bartee et al., describes a retractable electrical service fitting apparatus. Bartee et al. do not suggest retractable power and communication outlet arrangements according to the claimed invention.

U.S. Pat. No. 5,122,069, issued on Jun. 16, 1992 to Alan W. Brownlie et al., describes a retractable access flooring module. Brownlie et al. '069 does not suggest retractable power and communication outlet arrangements according to the claimed invention.

U.S. Pat. No. 5,230,552, issued on Jul. 27, 1993 to Timothy H. Schipper et al., describes a retractable worksurface utilities module. Schipper et al. do not suggest retractable power and communication outlet arrangements according to the claimed invention.

U.S. Pat. No. 5,351,173, issued on Sep. 27, 1994 to Norman R. Byrne, describes a retractable communications terminal center. Byrne '173 does not suggest retractable power and communication outlet arrangements according to the claimed invention.

U.S. Pat. No. 5,575,668, issued on Nov. 19, 1996 to Paul Timmerman, describes a temporary power/data tap designed to temporarily deliver electrical power and data service from a standard electrical receptacle and data port located in a wall or floor located near a work surface. Timmerman does not suggest retractable power and communication outlet arrangements according to the claimed invention.

Germany Patent document 2,116,401, published on Oct. 12, 1972, describes a retractable junction box including a swivel frame. Germany '401 does not suggest retractable power and communication outlet arrangements according to the claimed invention.

Germany Patent document 3,416,486, published on Nov. 22, 1984, describes a retractable socket mounting base. Germany '486 does not suggest retractable power and communication outlet arrangements according to the claimed invention.

International Patent document WO 91/16741, published on Oct. 31, 1991, describes a guard removably attached to an electrical outlet socket to prevent accidental or unauthorized removal of an electrical plug from a socket. International '741 does not suggest retractable power and communication outlet arrangements according to the claimed invention.

Italy Patent document 599,844, published on Nov. 19, 1959, appears to show a retractable service device. Italy '844 does not suggest retractable power and communication outlet arrangements according to the claimed invention.

Japan Patent document 52-10586, published on Jan. 26, 1977, describes a retractable floor outlet. Japan '586 does not suggest retractable power and communication outlet arrangements according to the claimed invention.

Japan Patent document 6-22433, published on Jan. 28, 1994, describes a retractable electrical connection means. Japan '433 does not suggest retractable power and communication outlet arrangements according to the claimed invention.

Japan Patent document 6-98444, published on Apr. 8, 1994, describes a retractable spherical outlet receptacle. Japan '444 does not suggest retractable power and communication outlet arrangements according to the claimed invention.

None of the above inventions and patents, taken either singly or in combination, is seen to describe the instant invention as claimed.

SUMMARY OF THE INVENTION

The present invention includes retractable power and communication outlets configured in arrangements suitable for mounting on a work surface, such as a table, a desk, or the like. The work surface is also equipped with an electrical appliance, such as a computer or the like. A first type of retractable power outlet arrangement includes a mounting cup for inserting into a hole in a work surface. The mounting cup includes a substantially flat circular top which has a beveled exterior edge. Positioned in the center of the circular top is a circular hole. The circular hole forms the beginning of a cylinder which extends for some distance below the circular top to a lower end. Two grooves are formed in the cylinder and extend from the upper end of the cylinder to the lower end of the cylinder.

The first type of retractable power arrangement additionally includes a mounting bracket. The mounting bracket includes a flat top which is substantially circular with the exception of two opposing semicircular notches. The mounting bracket flat top is dimensioned to conform with the diameter of the circular top of the mounting cup excluding the beveled edge. Integrally formed with the mounting bracket flat top is a longitudinally extending flat element which includes four mounting pegs that extend from the flat element in two rows of two pegs. The mounting pegs are used to mount a power strip. The flat element is dimensioned to frictionally slide through the grooves of the cylinder. The flat element will remain positioned after removal of any external moving force. While the mounting cup and the mounting bracket may be made of any material, they are preferably formed of non-conductive material such as plastic or the like.

The power strip for the first type of retractable power outlet arrangement comprises a rectangularly shaped housing having a front side and a back side connected together by sidewalls. On the back side of the housing are four mounting peg holes for receiving the mounting pegs on the flat element of the mounting bracket (FIGS. 2 and 3 in shadow). On the front side of the housing are a plurality of power outlet receptacles and a power on/off switch. The power outlet receptacles are capable of receiving power prongs extending from a plug of a power element connected to an electrical device. The power strip also includes a power cable terminating in the form of a plug for connecting the power strip to a power supply outlet receptacle. The power strip may also include a surge protector to protect the power outlet receptacles from any possible surges that occur at the power supply outlet receptacle.

A similarly configured first type of retractable communication arrangement includes a mounting cup and a mounting bracket substantially as described above. However, the mounting bracket includes a flat element dimensionally configured to coincide with a communication strip which includes a plurality of communication receptacles, such as telecommunication jacks. Preferably, the communication strip includes eight communication receptacles separated into two groups of four at either end of the communication strip. Integrally formed with the mounting bracket flat top is a longitudinally extending flat element which includes four mounting pegs that extend from the flat element in two rows of two. The mounting pegs are used to mount the communication strip. The flat element is dimensioned to frictionally slide through the grooves of the cylinder. The flat element will remain positioned after removal of any external moving force. While the mounting cup and the mounting bracket may be made of any material, they are preferably formed of non-conductive material such as plastic or the like.

The communication strip comprises a rectangularly shaped housing having a front side and a back side connected together by side walls. On the back side of the housing are four mounting peg holes for receiving the mounting pegs on the flat element of the mounting bracket. On the front side of the housing are a plurality of communication receptacles. The communication receptacles are capable of receiving communication elements from devices such as telephones, computers, and the like.

A second type of retractable power outlet arrangement includes a mounting cup for inserting into a hole in a work surface. The mounting cup for the second type of retractable power arrangement is substantially the same as the mounting cup for the first type of retractable power arrangement described above. The mounting cup includes a substantially flat circular top which has a beveled exterior edge. Positioned in the center of the circular top is a circular hole. The circular hole forms the beginning of a cylinder which extends for some distance below the circular top to a lower end. However, rather than having two grooves formed in the cylinder that extend from the upper end of the cylinder to the lower end of the cylinder, the mounting cup for the second type of retractable power arrangement is formed with three ridges extending in varying lengths from the inner wall of the lower end of the cylinder. Two diagonally opposing long ridges extend from the lower end of the cylinder to the upper end of the cylinder. A third short ridge extends from lower end of the cylinder for a distance of about half of the cylinder length. The lower end of the cylinder also includes a shelf which extends from one long ridge to the short ridge.

A key difference between the first type of retractable power outlet arrangement and the second type of retractable power outlet arrangement is that the second type of retractable power outlet arrangement does not include a mounting bracket. The power strip is substantially conventionally configured, comprising a rectangularly shaped housing having a front side and a back side connected together by side walls. The back side of the housing does not include mounting peg holes for receiving mounting pegs from a mounting bracket. The front side of the housing includes a plurality of power outlet receptacles and a power on/off switch. The power outlet receptacles are capable of receiving power prongs extending from a plug of a power element connected to an electrical device.

At the top of the power strip is a mounting cap. The mounting cap is configured in the form of a flat top which is substantially circular with the exception of two opposing semicircular notches. The mounting cap is dimensioned to rest on the rim of the mounting cup, thereby preventing the power strip from falling through the mounting cup. The power strip also includes a power cable (not shown) terminating in the form of a plug for connecting the power strip to a power supply outlet receptacle. The mounting cap may be a separate piece which may be physically secured to the power strip by adhesive means. However, the mounting cap may also be integrally formed with the power strip. The power strip may also include a surge protector to protect the power outlet receptacles from any possible surges that occur at the power supply outlet receptacle.

When this type of retractable power outlet arrangement is not in use the power strip is positioned in the mounting cup with the flat top of the mounting cup resting on the circular flat top of the mounting cup. The front side of the power strip housing is in contact with the long ridge. The back side of the power strip housing is in contact with the short ridge, the long ridge, and the edge of the shelf. When a user wishes to use the retractable power strip, the user grasps the top of the power strip arrangement by means of the semicircular notches in the mounting cap. The power strip is then raised until the bottom of the power strip is slightly above the short ridge. The user then rotates the power strip clockwise by ninety degrees and then lowers the power strip. The bottom of the power strip will ultimately rest on the shelf and rotation of the power strip will be prevented by means of ridges.

A second type of retractable communication arrangement includes a mounting cup for inserting into a hole in a work surface. The mounting cup for the second type of retractable communication arrangement is substantially the same as the mounting cup for the first type of retractable communication arrangement described above. The mounting cup includes a substantially flat circular top which has a beveled exterior edge. Positioned in the center of the circular top is a circular hole. The circular hole forms the beginning of a cylinder which extends for some distance below the circular top to a lower end. However, rather than having two grooves formed in the cylinder that extend from the upper end of the cylinder to the lower end of the cylinder, the mounting cup for the second type of retractable power arrangement is formed with three ridges extending in varying lengths from the inner wall of the lower end of the cylinder. Two diagonally opposing long ridges extend from the lower end of the cylinder to the upper end of the cylinder. A third short ridge extends from lower end of the cylinder for a distance of about half of the cylinder length. The lower end of the cylinder also includes a shelf which extends from one long ridge to the short ridge.

A key difference between the first type of retractable communication arrangement and the second type of retractable communication arrangement is that the second type of retractable communication arrangement does not include a mounting bracket. The communication strip is substantially conventionally configured, comprising a rectangularly shaped housing having a front side and a back side connected together by side walls. The back side of the housing does not include mounting peg holes for receiving mounting pegs from a mounting bracket. The front side of the housing includes a plurality of communication receptacles. Preferably, the communication strip includes eight communication receptacles separated into two groups of four at either end of the communication strip. The communication receptacles are capable of receiving communication elements from devices such as telephones, computers, and the like. However, the housing also includes a rectangularly shaped notch that extends along one side of the housing from the front side to the back side. The notch is positioned above the lower group of communication receptacles, and has a height slightly greater than the length from the top of the lower ridge to the bottom of the shelf.

At the top of the communication strip is a mounting cap. The mounting cap is configured in the form of a flat top which is substantially circular with the exception of two opposing semicircular notches. The mounting cap is dimensioned to rest on the rim of the mounting cup, thereby preventing the communication strip from falling through the mounting cup. The mounting cap is shown as a separate piece which may be physically secured to the communication strip by adhesive means. However, the mounting cap may also be integrally formed with the communication strip.

When this type of retractable communication arrangement is not in use the communication strip is positioned in the mounting cup with the mounting cap resting on the circular flat top of the mounting cup. The front side of the communication strip housing is in contact with the long ridge. The back side of the communication strip housing is in contact with the short ridge, the long ridge, and the edge of the shelf. When a user wishes to use the retractable communication strip, the user grasps the top of the communication strip arrangement by means of the semicircular notches in the mounting cap. The communication strip is then raised until the rectangularly shaped notch in the side of the communication strip housing is substantially positioned adjacent to the short ridge. The user then rotates the communication strip clockwise by ninety degrees and then lowers the communication strip. The upper end of the rectangularly shaped notch in the communication strip housing will ultimately rest on the shelf and rotation of the communication strip will be prevented by means of ridges.

Accordingly, it is a principal object of the invention to provide retractable power and communication outlet arrangements for mounting power outlet or communication strips.

It is another object of the invention to provide retractable power outlet arrangements for mounting in a flat surface.

It is a further object of the invention to provide retractable communication outlet arrangements for telecommunication equipment.

It is an object of the invention to provide improved elements and arrangements thereof in retractable power and communication outlet arrangements for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
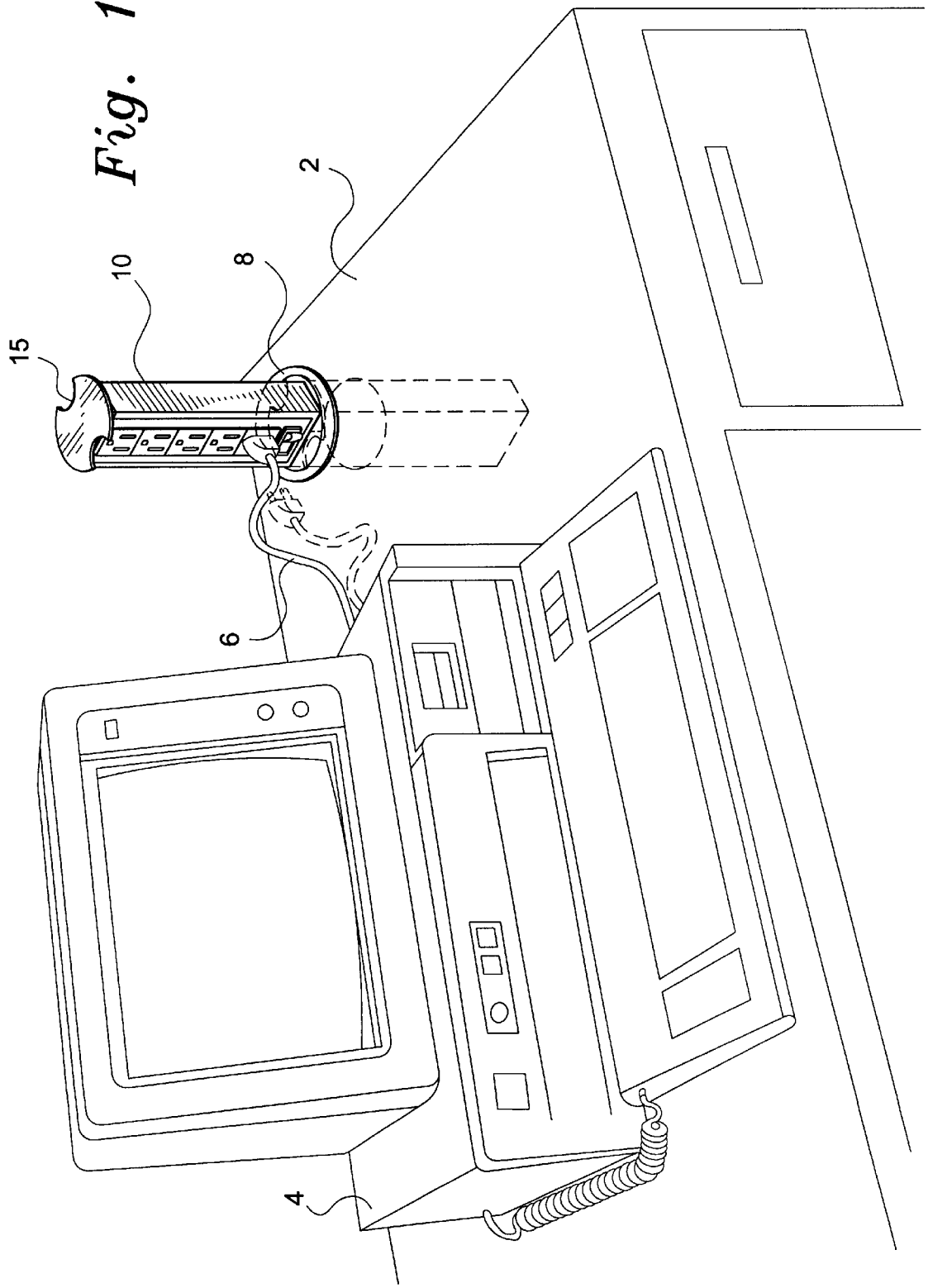
FIG. 1 is an environmental, perspective view of a retractable power outlet arrangement mounted in a desk according to the present invention.

Referring now to the drawings, and particularly to FIG. 1, a first type of retractable power outlet arrangement 10 mounted on a work surface 2 of a desk is shown. For purposes of illustration, the work surface 2 is shown equipped with a computer 4. However, it will be readily understood by those skilled in the art that the work surface may be equipped with any type of electrical appliance. The computer 4 includes a power cord 6 which may be attached to the retractable power outlet arrangement 10.

Figure 2:
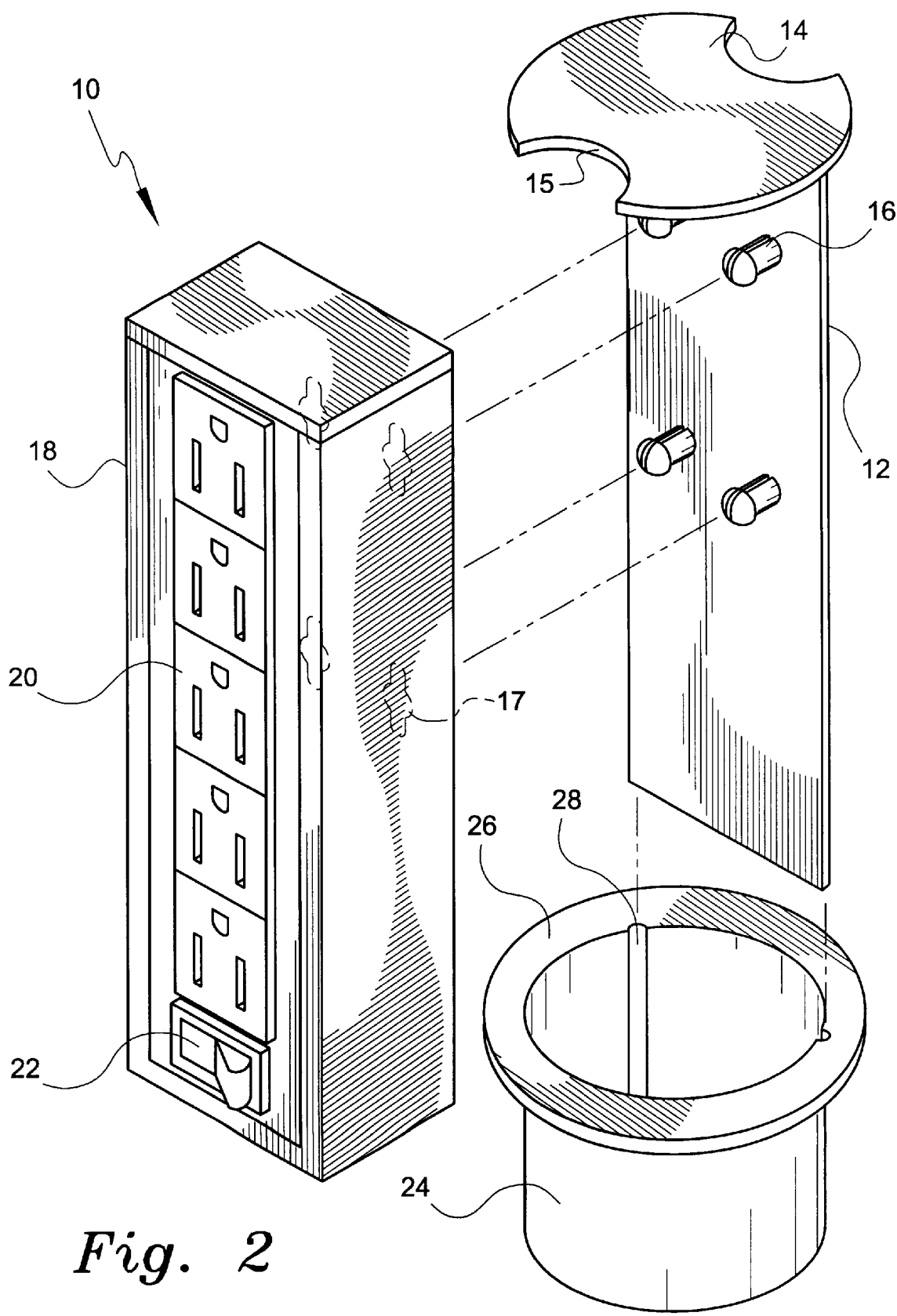
FIG. 2 is an exploded view of a first type of retractable power outlet arrangement according to the invention.

The first type of retractable power outlet arrangement 10, more particularly shown in FIG. 2, includes a mounting cup 8 for inserting into a hole in the work surface 2. The mounting cup 8 includes a substantially flat circular top lip 26. Positioned in the center of the circular top lip 26 is a circular hole. The circular hole forms the beginning of a cylinder 24 which extends for some distance below the circular top lip 26 to a lower end. Two grooves 28 are formed in the cylinder 24 and extend from the upper end of the cylinder 24 to the lower end of the cylinder 24. The retractable power arrangement 10 additionally includes a mounting bracket 12. The mounting bracket 12 includes a flat top 14 which is substantially circular with the exception of two opposing semicircular notches 15. The mounting bracket flat top 14 is dimensioned to conform with the diameter of the circular top 26 of the mounting cup 8 excluding the beveled edge. Integrally formed with the mounting bracket flat top 14 is a longitudinally extending flat element which includes four mounting pegs 16 that extend from the flat element in two rows of two pegs. The mounting pegs 16 are used to mount a power strip 18. The flat element is dimensioned to frictionally slide through the grooves 28 of the cylinder 24 to maintain its vertical position. The flat element will remain positioned after removal of any external moving force. While the mounting cup 8 and the mounting bracket 12 may be made of any material, preferably they are formed of non-conductive material such as plastic or the like.

The power strip 18 comprises a rectangularly shaped housing having a front side and a back side connected together by a side-wall. On the back side of the housing are four mounting peg holes 17 (in shadow) for receiving the mounting pegs 16 on the flat mounting bracket 12. On the front side of the housing are a plurality of power outlet receptacles 20 and a power on/off switch 22. The power outlet receptacles 20 are capable of receiving power prongs extending from a plug of a power element connected to an electrical device. The power strip 18 also includes a power cable 6 (FIG. 1) terminating in the form of a plug 7 for connecting the power strip 18 to a power supply outlet receptacle. The power strip 18 may also include a surge protector (hidden) to protect the power outlet receptacles 20 from any possible surges that occur at the power supply outlet receptacle.

Figure 3:
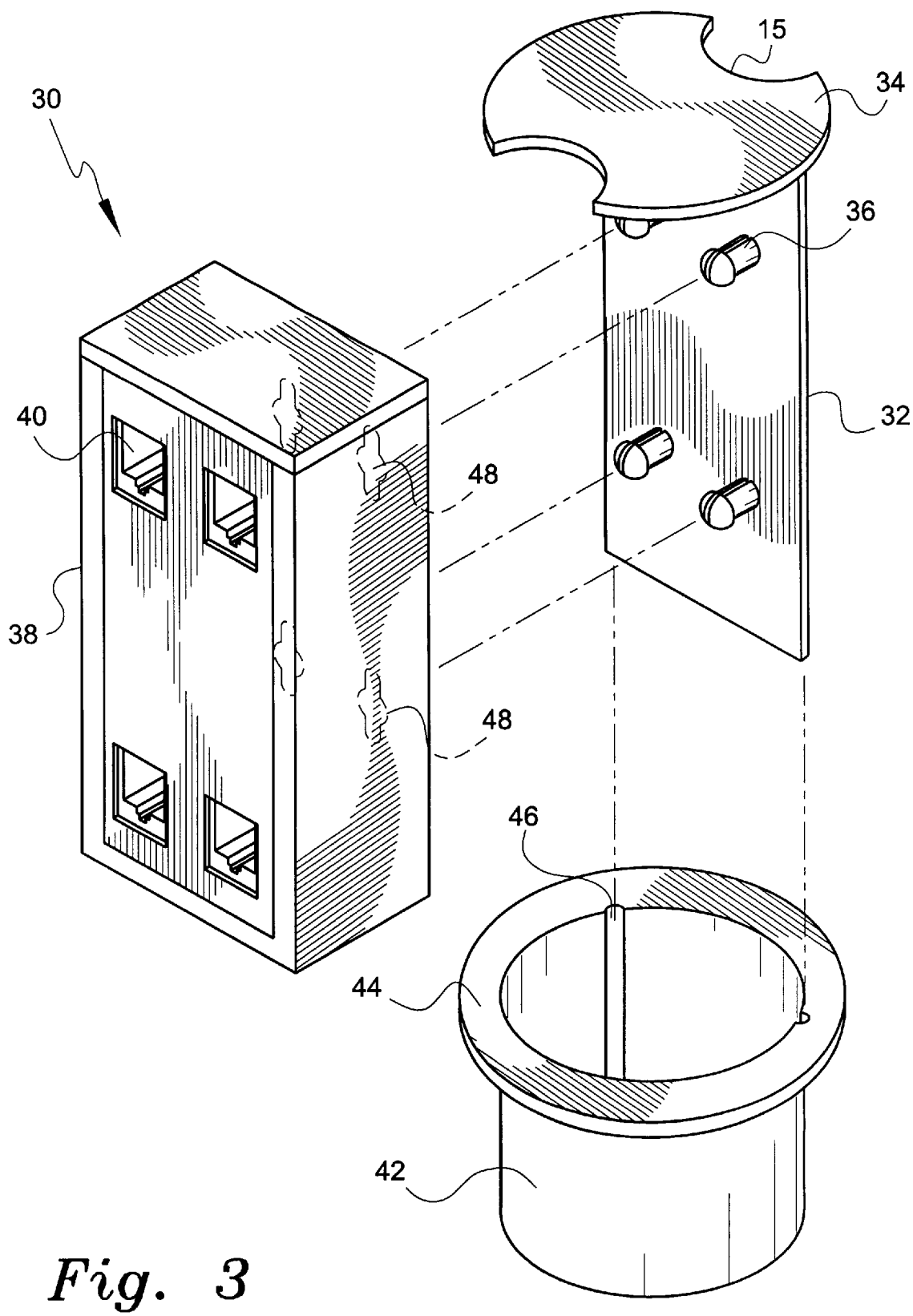
FIG. 3 is an exploded view of a first type of retractable communication arrangement according to the invention.

A similarly configured first type of retractable communication arrangement 30 is shown in FIG. 3. The retractable communication arrangement 30 includes a mounting cup 42 with a flat circular 11p 44 and a mounting bracket 32. The mounting bracket 32 is a flat element dimensionally configured to coincide with a power strip 38 which includes a plurality of power receptacles 40, such as telecommunication jacks. Preferably, the power strip 38 includes four power receptacles 40 separated into two groups of (two) at either end of the power strip 38. Integrally formed with the mounting bracket's flat top 34 is the longitudinally extending flat mounting bracket 22 which includes four mounting pegs 36 that extend from the flat mounting bracket 32 in two rows of two pegs. The mounting pegs 36 are used to mount the power strip 38. The mounting bracket 32 is dimensioned to frictionally slide through the grooves 46 of the mounting cup cylinder 42. The mounting bracket 32 will remain positioned after removal of any external moving force. While the mounting cup 42 and the mounting bracket 32 may be made of any material, preferably they are formed of non-conductive material such as plastic or the like.

The power strip 38 comprises a rectangularly shaped housing having a front side and a back side connected together by side walls. On the back side of the housing are four mounting peg holes 48 for receiving the mounting pegs 36 on the flat mounting bracket 32. On the front side of the housing are a plurality of power receptacles 40. The power receptacles 40 are capable of receiving communication elements from devices such as telephones, computers, and the like.

Figure 4:
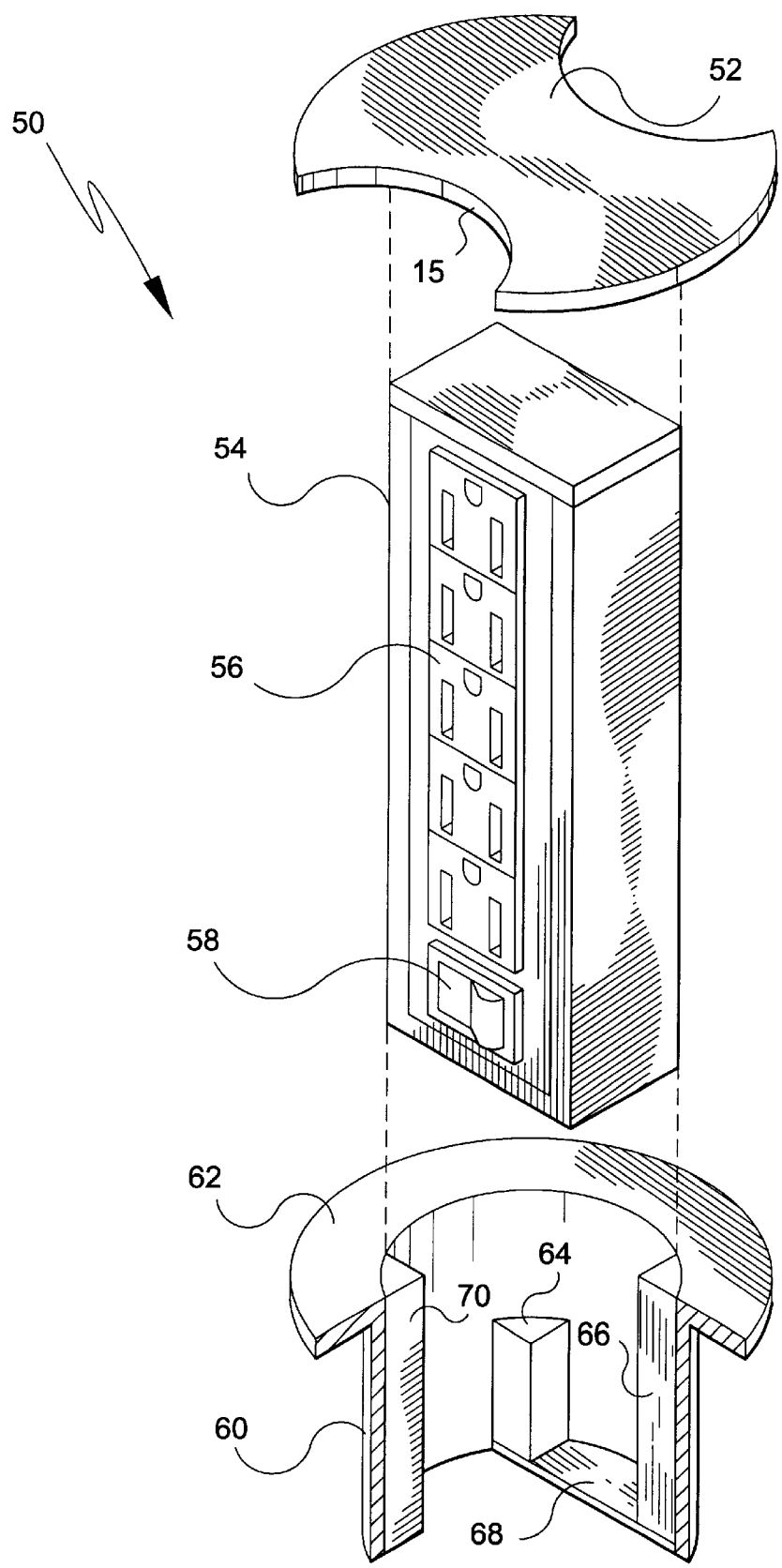
FIG. 4 is an exploded view of a second type of retractable power outlet arrangement according to the invention.

A second type of retractable power outlet arrangement 50 is shown in FIG. 4. As with the first type of retractable power outlet arrangement 10 shown in FIG. 2, the second type of retractable power outlet arrangement 50 includes a mounting cup for inserting into a hole in a work surface. The mounting cup for the second type of retractable power arrangement 50 is similar to the mounting cup for the first type of retractable power arrangement described above. The mounting cup 60 includes a flat circular top lip 62. Positioned in the center of the circular top lip 62 is a circular hole. The circular hole forms the beginning of the cylinder 60 which extends for some distance below the circular top lip 62 to a lower end. However, rather than having two grooves formed in the cup 60 that extend from the upper end of the cup to the lower end of the cup, the mounting cup for the second type of retractable power arrangement 50 is formed with three ridges 64,66,70 extending in varying lengths from the inner wall of the lower end of the cup 60. Two long ridges 66,70 positioned at approximately a right angle from each other extend from the lower end of the cup 60 to the upper end of the cup 60. A third short ridge 64 extends from lower end of the cup 60 for a distance of about half of the cup's length. The lower end of the cup 60 also includes a shelf 68 which extends from one long vertical 66 to the short vertical 64.

A key difference between the first type of retractable power outlet arrangements 10 (FIG. 4 and 80 (FIG. 5) and the second type of retractable power outlet arrangement 50 is that the second type of retractable power outlet arrangement does not include a mounting bracket. The power strip 54 is substantially conventionally configured, comprising a rectangularly shaped housing having a front side and a back side connected together by side walls. The back side of the housing does not include mounting peg holes for receiving mounting pegs from a mounting bracket. The front side of the housing includes a plurality of five power outlet receptacles 56 and a power on/off switch 58. The power outlet receptacles 56 are capable of receiving power prongs extending from a plug of a power element connected to an electrical device.

At the top of the power strip 54 is a mounting cap 52. The mounting cap 52 is configured in the form of a flat top which is substantially circular with the exception of two opposing semicircular notches 15. The mounting cap 52 is dimensioned to rest on the lip 62 of the mounting cup 60, thereby preventing the power strip 54 from falling through the mounting cup 62. The power strip 54 also includes a power cable (not shown) terminating in the form of a plug (not shown) for connecting the power strip to a power supply outlet receptacle. The mounting cap 52 is shown as a separate piece which may be physically secured to the power strip 54 by adhesive means. However, the mounting cap 52 may also be integrally formed with the power strip 54. The power strip 54 may also include a surge protector (hidden)

to protect the power outlet receptacles 56 from any possible surges that occur at the power supply outlet receptacle.

When this type of retractable power outlet arrangement 50 is not in use the power strip 54 is positioned in the mounting cup 60 with the flat top of the mounting cup 52 resting on the circular flat top lip 62 of the mounting cup. The front side of the power strip housing is in contact with the long ridge 70. The back side of the power strip housing is in contact with the short ridge 64, the long ridge 66, and the edge of the shelf 68. When a user wishes to use the retractable power strip 54, the user grasps the top of the power strip arrangement 50 by means of the semicircular notches 15 in the mounting cap 52. The power strip 54 is then raised until the bottom of the power strip 54 is slightly above the short ridge 64. The user then rotates the power strip 54 clockwise by ninety degrees and then lowers the power strip 54. The bottom of the power strip 54 will ultimately rest on the shelf 68 and rotation of the power strip 54 will be prevented by means of ridges 64,66,70.

Figure 5:
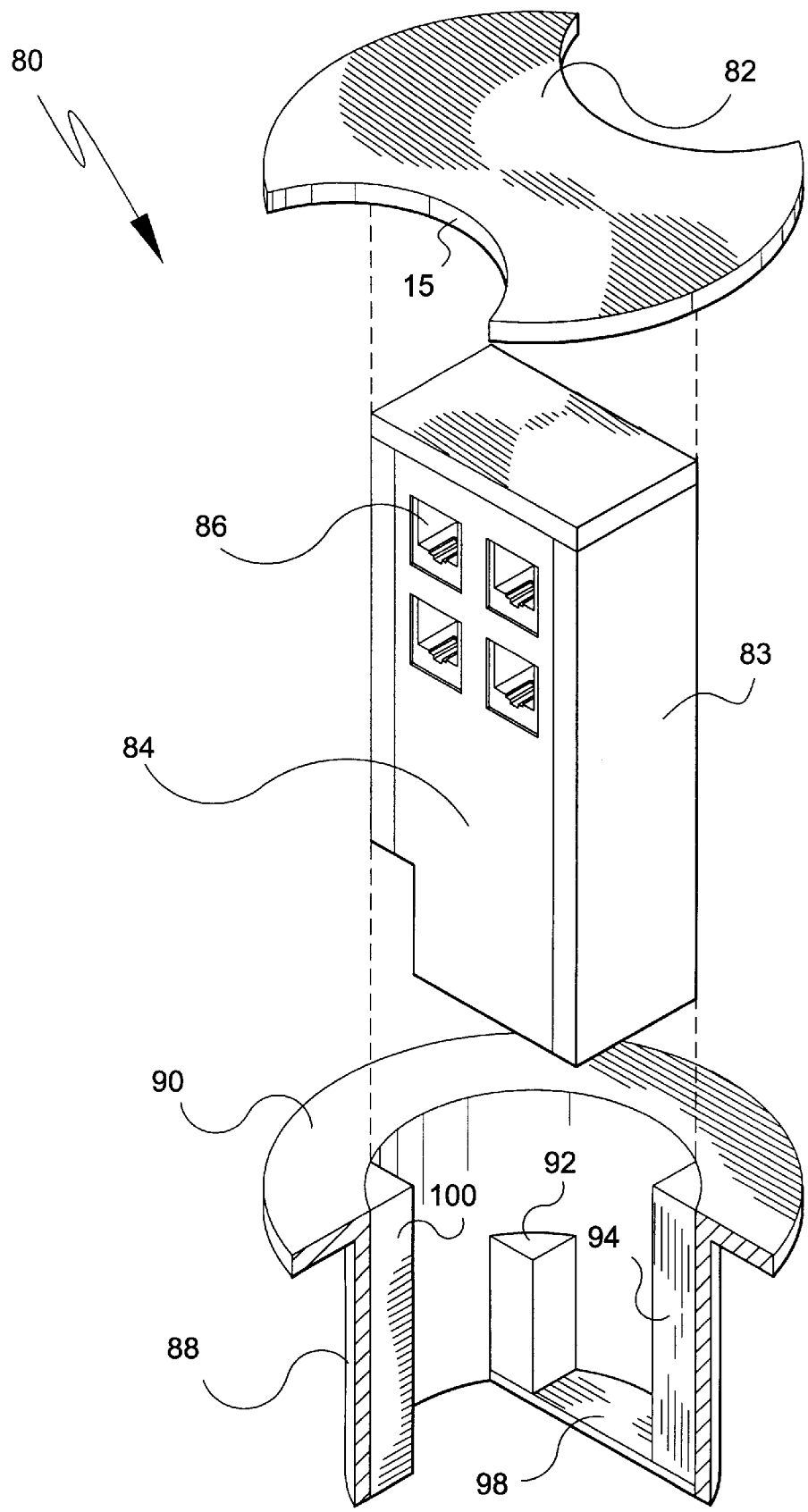
FIG. 5 is an exploded view of a second type of retractable communication arrangement according to the invention.

A second type of retractable communication arrangement 80 is shown in FIG. 5. As with the first type of retractable communication arrangement 30 shown in FIG. 3, the second type of retractable communication arrangement 80 includes a mounting cup 88 for inserting into a hole in a work surface. The mounting cup 88 for the second type of communication arrangement 80 is substantially the same as the mounting cup 42 for the first type of retractable communication arrangement 30 described above. The mounting cup 88 includes a substantially flat circular lip 90. Positioned in the center of the circular top 90 is a circular hole. The circular hole forms the beginning of the cup 88 which extends for some distance below the circular lip 90 to a lower end. However, rather than having two grooves formed in the cup that extend from the upper end of the cup to the lower end of the cup, the 88 for the second type of retractable communication arrangement 80 is formed with three ridges 92,94,100 (as in the cup in FIG. 4) extending in varying lengths from the inner wall of the lower end of the cup 88. Two long ridges 94,100 positioned at approximately a right angle from each other extend from the lower end of the cup 88 to the upper end of the cup 88. A third short ridge 92 extends from the lower end of the cup 88 for a distance of about half of the cup's length. The lower end of the cup 88 also includes a shelf 98 which extends from one long ridge 94 to the short ridge 92.

A key difference between the first type of retractable communication arrangement 30 and the second type of retractable communication arrangement 80 is that the second type of retractable communication arrangement 80 does not include a mounting bracket. The power strip 84 is substantially conventionally configured, comprising a rectangularly shaped housing 83 having a front side and a back side connected together by sidewalls. The back side of the housing does not include mounting peg holes for receiving mounting pegs from a mounting bracket. The front side of the housing includes a plurality of power receptacles 86. Preferably, the communication strip 84 includes four power receptacles 86. The power receptacles 86 are capable of receiving communication elements from devices such as telephones, computers, and the like. However, the housing also includes a rectangularly shaped notch 87 that extends along one side of the housing 83 from the front side to the back side. The notch 87 is positioned at the left sidewall, and has a height slightly greater than the length from the top of the short ridge 92 to the bottom of the shelf 98.

At the top of the communication strip 84 is a mounting cap 82. The mounting cap 82 is configured in the form of a flat top which is substantially circular with the exception of two opposing semicircular 15. The mounting cap 82 is dimensioned to rest on the lips 90 of the mounting cup, thereby preventing the power strip 84 from falling through the mounting cup 82. The mounting cap 82 is shown as a separate piece which may be physically secured to the power strip 84 by adhesive means. However, the mounting cap 82 may also be integrally formed with the communication strip 84.

When this type of retractable communication arrangement 80 is not in use the communication strip 84 is positioned in the mounting cup with the mounting cap 82 resting on the circular flat top 90 of the mounting cup. The front side of the communication strip housing is in contact with the long ridge 100. The back side of the communication strip housing is in contact with the short ridge 92, the long ridge 94, and the edge of the shelf 98. When a user wishes to use the retractable communication strip 84, the user grasps the top of the communication strip arrangement 80 by means of the semicircular notches in the mounting cap 82. The communication strip 84 is then raised until the rectangularly shaped notch in the side of the communication strip housing is substantially positioned adjacent to the short ridge 92. The user then rotates the communication strip 84 clockwise by ninety degrees and then lowers the communication strip 84. The upper end of the rectangularly shaped notch in the communication strip housing will ultimately rest on the shelf 98 and rotation of the communication strip 84 will be prevented by means of ridges 92,94,100.

It is to be understood that the. present invention is not limited to the embodiments described above, but encompasses any and all embodiments within the scope of the following claims.

What is claimed is:

1. A retractable utility arrangement for mounting on a work surface comprising:
   a mounting cup including a substantially flat circular top having a diameter, a center, a beveled exterior edge, a circular hole in the center of the circular top, and a cylinder with two opposing grooves that extend from the from the circular hole for a distance;
   a mounting bracket dimensioned to conform with the diameter of the top of the mounting cup that has a flat top which is substantially circular with two opposing semicircular notches, and an integrally formed longitudinally extending flat rectangular element having vertical edges with four mounting pegs extending therefrom in two rows of two, wherein the vertical edges of the flat rectangular element engage the opposing grooves in the cylinder; and
   a utility strip including a rectangularly shaped housing having a front side with a plurality of utility receptacles and a back side with four holes for receiving the mounting pegs on the flat rectangular element of the mounting bracket, wherein the front side and the back side are connected together by sidewalls.

2. The retractable utility arrangement according to claim 1, wherein said mounting cup and said mounting bracket are made of plastic.

3. The retractable utility arrangement according to claim 1, wherein said utility strip is a power strip and said utility receptacles are power outlet receptacles.

4. The retractable utility arrangement according to claim 3, wherein said front side of said housing further comprises an on/off strip switch.

5. The retractable utility arrangement according to claim 3, wherein said power strip further comprises a surge protector.

6. The retractable utility arrangement according to claim 1, wherein said utility strip is a communication strip and said utility receptacles are communication receptacles.

7. The retractable utility arrangement according to claim 6, wherein said communication receptacles are telecommunication jacks.

8. The retractable utility arrangement according to claim 7, wherein there are at least four telecommunication jacks.

9. A retractable utility arrangement for mounting on a work surface comprising:
- a mounting cup including a substantially flat circular top having a diameter, a center, a beveled exterior edge, a circular hole in the center of the circular top, and a cylinder with two diagonally opposing long ridges extending from a lower end of the cylinder to an upper end of the cylinder, a short ridge extending from the lower end of the cylinder for a distance of about half of the cylinder length, and a shelf which extends from one long ridge to the short ridge;
- a mounting cap dimensioned to conform with the diameter of the circular top of the mounting cup, said mounting cap having a flat top and two opposing semicircular notches; and,
- a utility strip including a rectangularly shaped housing having a front side with a plurality of utility receptacles, a back side, and sidewalls connecting the front side to the back side of the housing.

10. The retractable utility arrangement according to claim 9, wherein said mounting cup and said mounting cap are made of plastic.

11. The retractable utility arrangement according to claim 9, wherein said utility strip is a power strip and said utility receptacles are power outlet receptacles.

12. The retractable utility arrangement according to claim 11, wherein said front side of said housing further comprises an on/off switch.

13. The retractable utility arrangement according to claim 11, wherein said power strip further comprises a surge protector.

14. The retractable utility arrangement according to claim 9, wherein said utility strip is a communication strip and said utility receptacles are communication receptacles.

15. The retractable utility arrangement according to claim 14, wherein said communication receptacles are telecommunication jacks.

16. The retractable utility arrangement according to claim 15, wherein there are at least four telecommunication jacks.

* * * * *